UNITED STATES PATENT OFFICE.

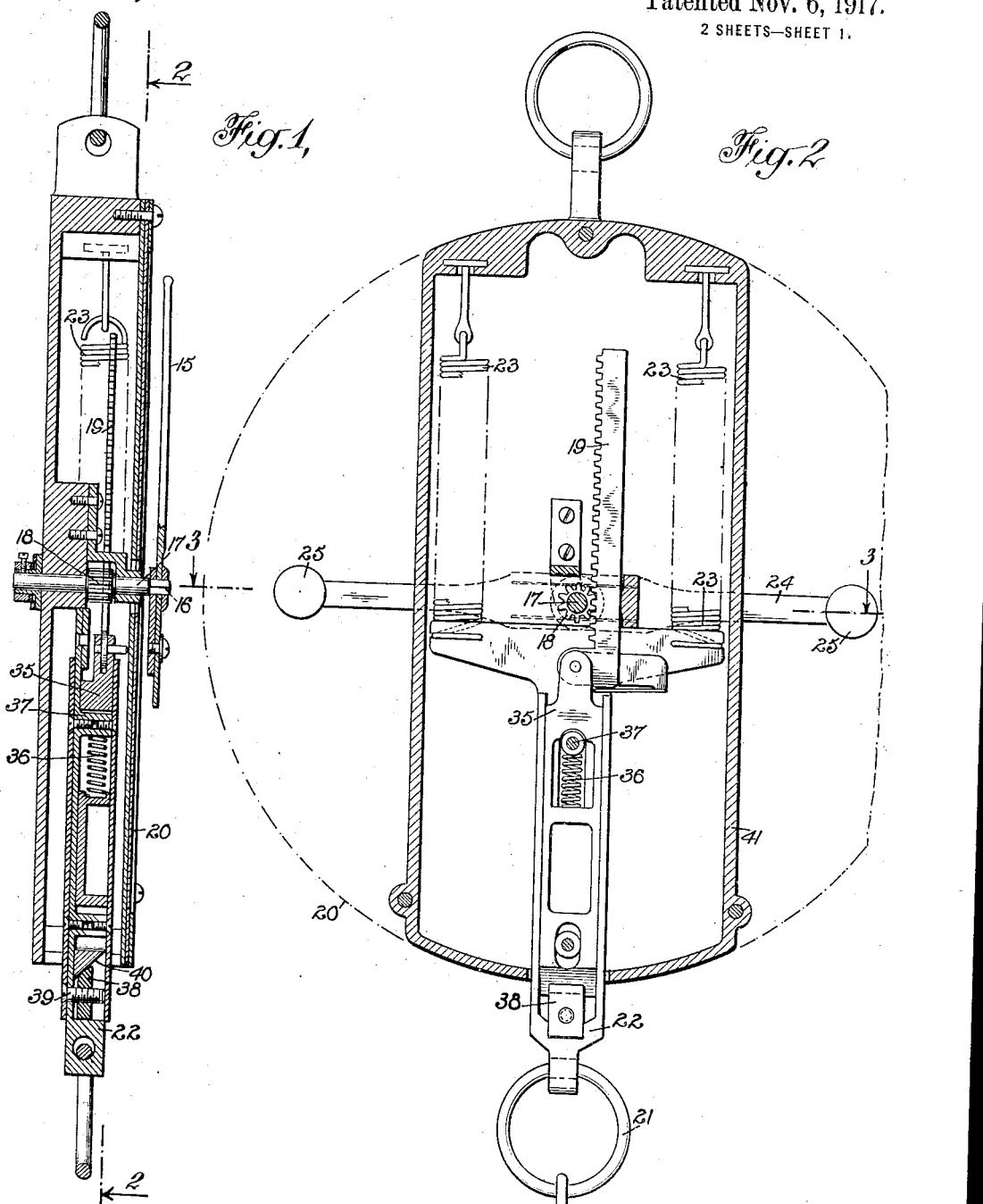

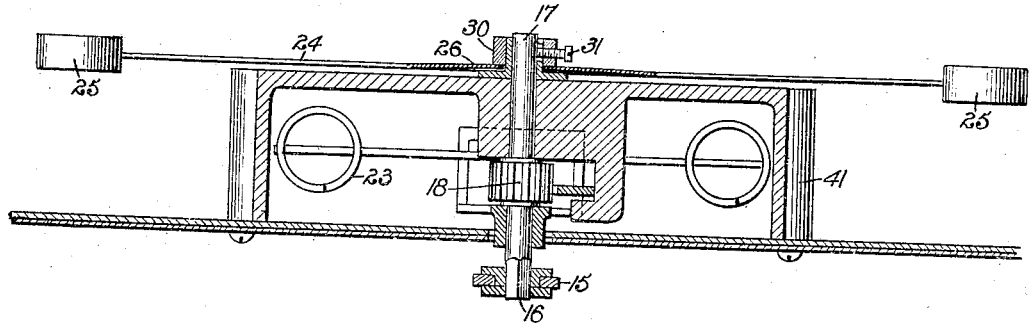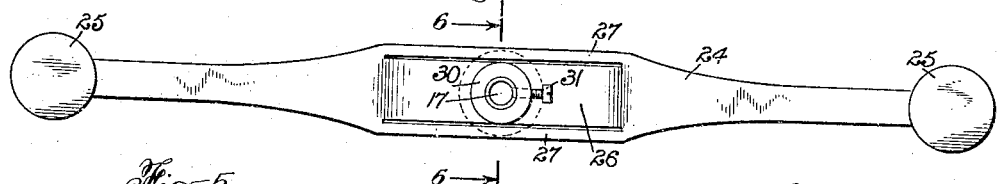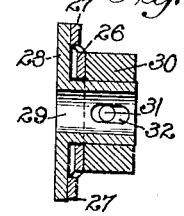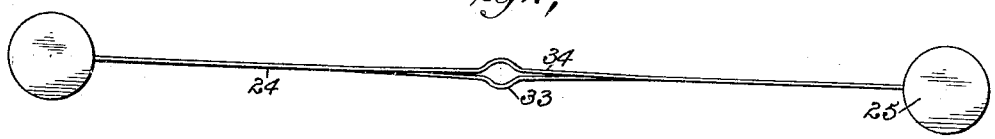

TIMOTHY B. POWERS, OF NEW YORK, N. Y., ASSIGNOR TO JACOBS BROS., INC., OF NEW YORK, N. Y., A CORPORATION OF NEW YORK.

MARKET WEIGHING-SCALES.

1,245,766.  Specification of Letters Patent.  Patented Nov. 6, 1917.

Application filed January 16, 1917. Serial No. 142,582.

*To all whom it may concern:*

Be it known that I, TIMOTHY B. POWERS, a citizen of the United States, and a resident of the city of New York, borough of Manhattan, in the county and State of New York, have invented a new and Improved Market Weighing-Scales, of which the following is a full, clear, and exact description.

Among the principal objects which the present invention has in view are: to prevent the oscillation of the index members employed in scales of the character mentioned; to provide means for arresting the oscillation mentioned which does not interfere with the operation of the mechanism scales; to provide means for correcting the operative relation of said index mechanism and the mechanism of the scales; and to vary the time factor in the operation of the scales.

Drawings.

Figure 1 is a vertical cross section of a scales constructed and arranged in accordance with the present invention;

Fig. 2 is a vertical section taken as on the line 2—2 therein;

Fig. 3 is a horizontal section on an enlarged scale, the section being taken as on the line 3—3 in Fig. 2;

Fig. 4 is a detail view showing a vibration-absorbing device employed in the present invention;

Fig. 5 is a detail view in perspective showing a friction cap for checking the movement of said absorbing device;

Fig. 6 is a section taken as on the line 6—6 in Fig. 4;

Fig. 7 is an edge view of a vibration-absorbing device constructed in accordance with a modified form of the invention;

Fig. 8 is a side view of the same.

Description.

As seen in the drawings, the index member has a pointer or clock-hand 15. The hand 15 is mounted on a squared end 16 of the spindle 17. The spindle 17 is provided with a pinion 18, the teeth whereof are engaged by a rack bar 19.

In the ordinary operation of the scales, when the article being measured is thrown upon the pan suspended from the ring 21 and the yoke bar 22 connected therewith, the springs 23 pass the point of rest corresponding with the weight of the material. This excess of movement is incident to the inertia of the falling load. The springs 23 overcome this inertia and check the falling weight and lift the same. In the elevation, the load is carried past the point of equipoise and is again checked by gravity and falls.

The index or pointer hand 15 follows the oscillation thus indicated, swinging the end of said pointer to both sides of the point of equipoise. Some time is lost waiting for the scales to "settle" and the hand 15 to come to rest.

It is to prevent the oscillation referred to that there is employed in the present invention the absorbing bar 24 and the counterweights 25. As seen best in Fig. 4 of the drawings, the bar 24 has at the middle section thereof, a deflected portion 26. The portion 26 is offset from the side portions 27, which normally rest on the flange 28 of the thimble 29. The thimble 29 normally fits over the spindle 17 and is movable lengthwise thereon. Over the barrel of the thimble 29 is slipped a collar 30. Through the collar 30 extends a screw 31, a tapped perforation being provided therefor.

The end of the screw 31 is extended through an elongated slot 32 in the thimble 29. The elongated slot while permitting the lengthwise movement of the thimble 29 prevents interference with the bearing of the screw 31 on the spindle 17. A further office is performed by this construction, by reason of the fact that when the screw 31 is set up, the collar 30 clamps the thimble 29 between the said collar and the spindle 17 to hold said thimble rigidly in adjusted position. It is obvious that when the flange 28 of the thimble 29 is moved beyond the collar 30, to press the portion 26 of the bar 24 against the surface of said collar, the freedom of movement of the bar 24 is somewhat limited.

Having a scales constructed as shown and described, the oscillation of the loaded pan and the index pointer 15 is counteracted. The frictional engagement of the bar 24 while not interfering with the initial movement of the spindle 17, is sufficient to impose thereon a retarding brake-like slip when the loaded pan and the rack bar 19 connected therewith endeavors to rise, or when the inertia of the counterweights 25 tends to carry the bar 24 beyond the normal point of rest.

It is obvious that when the pan and parts connected therewith are carried rapidly downward by the load thereon, the bar 24 with its weighted ends 25, is violently rotated and an inertive force is established in the counterweights 25. When the loaded pan and parts connected therewith start to return, the effort is counteracted in part by the continued rotation of the bar 24 and the counterweights 25.

In the modified form of the invention shown in Figs. 7 and 8 of the drawings, it will be seen that a spring section 33 is set out from the side sections 34 with which said spring section is associated to envelop the spindle 17. This form of the invention while having the advantages of economy and simplicity of construction, has the disadvantage of the inability to change the frictional drag of the bar 24 on the said spindle.

In scales of the character mentioned, many causes, such as wear of the co-acting parts, coöperate to disturb the normal setting of the hand 15. The reëstablish the hand 15 in its correct position, the rack 19 is connected with a sliding block 35 mounted between flanges of the pendent support 22. The sliding block 35 is normally extended by a spiral spring 36 anchored on a pin 37 structurally incorporated in the pendent support 22. The movement of the block 35 is counteracted by a wedge member 38, the operative disposition of which is controlled by a screw 39. The screw 39, as shown best in Fig. 1 of the drawings, has an exposed head by which said screw may be manipulated. The inclined face of the wedge member 38 moves over a corresponding face 40 at the lower end of the block 35, producing a weighing action thereon which forces the block 35 and the rack bar 19 carried thereby upward in proportion as the wedge member 38 is drawn toward the block 35. Movement of the rack 19 rotates the pinion 18 and the hand 15 connected therewith. It will be understood that a slight movement of the block 35, rack 19, and pinion 18, is all that at any time is required to re-adjust the hand or pointer 15 to its initial position.

The lower end of the pendent yoke bar 22 extends below the dial-supporting structure and the casing 41 thereof. By this construction, the head of the screw 39 is accessible for the purposes of correction in a manner obvious to such construction.

*Claims.*

1. A scales as characterized comprising a weight supporting member; a yielding support therefor; a vibratory index operatively connected therewith; and a weighted counter-acting member frictionally engaging said vibratory index for modifying the action thereof.

2. A scales as characterized comprising a weight-supporting member; spring supports for said member; a rotary index member; means operatively connecting said weight-supporting member and said index member; and a weighted vibration-absorbing member having a frictional connection with said index member for restraining any reflex action thereof.

3. A scales as characterized comprising a weight-supporting member; spring supports for said member; a rotary index member; means operatively connecting said weight-supporting member and said index member; a weighted vibration-absorbing member; means operatively connecting said vibration-absorbing member and said index member, said means embodying a brake mechanism between said vibration-absorbing member and said index member; and means for varying the tensity of said brake mechanism.

TIMOTHY B. POWERS.